(12) United States Patent
Dostie, Jr. et al.

(10) Patent No.: US 12,537,744 B2
(45) Date of Patent: Jan. 27, 2026

(54) MODEL-BASED INVENTORY OF WIRELESS TELECOMMUNICATION NETWORKS

(71) Applicant: Boost SubscriberCo L.L.C., Englewood, CO (US)

(72) Inventors: Thomas Edward Dostie, Jr., Highlands Ranch, CO (US); Bernie Christof Lehman, Aurora, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 549 days.

(21) Appl. No.: 17/989,495

(22) Filed: Nov. 17, 2022

(65) Prior Publication Data

US 2023/0336435 A1 Oct. 19, 2023

Related U.S. Application Data

(60) Provisional application No. 63/331,194, filed on Apr. 14, 2022.

(51) Int. Cl.
| | | |
|---|---|---|
| *H04L 41/147* | (2022.01) | |
| *H04W 84/04* | (2009.01) | |
| *H04L 41/14* | (2022.01) | |
| *H04L 41/16* | (2022.01) | |

(52) U.S. Cl.
CPC ......... *H04L 41/147* (2013.01); *H04W 84/042* (2013.01); *H04L 41/145* (2013.01); *H04L 41/16* (2013.01)

(58) Field of Classification Search
CPC ..... H04L 41/147; H04L 41/16; H04L 41/145; H04L 41/0886; H04L 41/082; H04L 43/0811; H04W 84/042

USPC ......................................................... 370/329
See application file for complete search history.

(56) References Cited

U.S. PATENT DOCUMENTS

| | | | | |
|---|---|---|---|---|
| 8,839,114 | B1* | 9/2014 | Glendinning | H04L 41/145 707/769 |
| 8,855,990 | B1* | 10/2014 | Woods | H04L 41/145 703/21 |
| 2007/0118643 | A1* | 5/2007 | Mishra | H04L 41/082 709/224 |
| 2017/0257279 | A1* | 9/2017 | Mishra | H04L 41/0886 |

(Continued)

*Primary Examiner* — Jungwon Chang
(74) *Attorney, Agent, or Firm* — Jeremiah J. Bauanch; Frontier IP Law PLLC

(57) ABSTRACT

Example embodiments are directed towards systems and methods for model-based inventory of wireless telecommunication networks. In response to receiving information regarding network components or connectivity as system components are implemented (e.g., installed and/or activated), the system may electronically compare the received information to a model previously built according to the current standards of the telecommunication service provider, such as a mobile network operator (MNO) for the wireless telecommunication network, and then electronically determine whether there exists a discrepancy between the received information regarding network components or connectivity and the model based on the comparison. An action may then be performed based on the determination of whether there exists a discrepancy, such as sending an alert or taking other corrective action.

17 Claims, 5 Drawing Sheets

(56) References Cited

U.S. PATENT DOCUMENTS

2021/0067605 A1\* 3/2021 Roth ................... H04L 67/1095
2022/0057864 A1\* 2/2022 Ito .......................... A63F 13/54

\* cited by examiner

Example Model ~200

| Cell Site ID 202 | Expected Router Information 204 | Expected Compute Node Information 206 | Expected Antenna Information 208 | Expected Radio Unit (RU) Information 210 | Expected Cabling Information 212 | | | | | | |
|---|---|---|---|---|---|---|---|---|---|---|---|
| X | Information A | Information B | Information C | Information D | Information E | . | . | . | . | . | . |
| Y | Information F | Information G | Information H | Information I | Information J | . | . | . | . | . | . |
| Z | Information K | Information L | Information M | Information N | Information O | . | . | . | . | . | . |
| . | . | . | . | . | . | . | . | . | . | . | . |
| . | . | . | . | . | . | . | . | . | . | . | . |
| . | . | . | . | . | . | . | . | . | . | . | . |

FIG. 2

MODEL-BASED INVENTORY OF WIRELESS TELECOMMUNICATION NETWORKS

TECHNICAL FIELD

The present disclosure relates generally to telecommunication networks, more particularly, to model-based inventory of wireless telecommunication networks.

BRIEF SUMMARY

As a wireless telecommunication service provider builds their network (such as a cloud-native 5G wireless network) there may be issues, potential issues or errors made during the actual implementation of the network as network components are installed and activated that may cause delay in network deployment, operation and maintenance. Thus, the earlier such issues, potential issues and errors can be identified and addressed, the more time and costs can be saved when deploying the network. It is with respect to these and other considerations that the embodiments described herein have been made.

Briefly described, embodiments disclosed herein are directed to a model-based inventory of wireless telecommunication networks. For example, a method in a wireless telecommunication network operated by a mobile network operator (MNO) may comprise electronically building a model (or "scaffolding") of at least one planned portion of the wireless telecommunication network according to current standards of the MNO for the wireless telecommunication network and then electronically receiving information regarding network components or connectivity in response to actual implementation of the planned portion of the wireless telecommunication network. In response to receiving the information regarding network components or connectivity, the system may electronically compare the received information regarding network components or connectivity to the model built according to the current standards of the MNO for the wireless telecommunication network and then electronically determine whether there exists a discrepancy between the received information regarding network components or connectivity and the model. An action may then be performed (e.g., to address the issue) based on the determination of whether there exists a discrepancy between the received information regarding network components or connectivity and the model.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 2 is a diagram of an example data structure representing an example model of a portion of a wireless telecommunication network in accordance with an embodiment described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
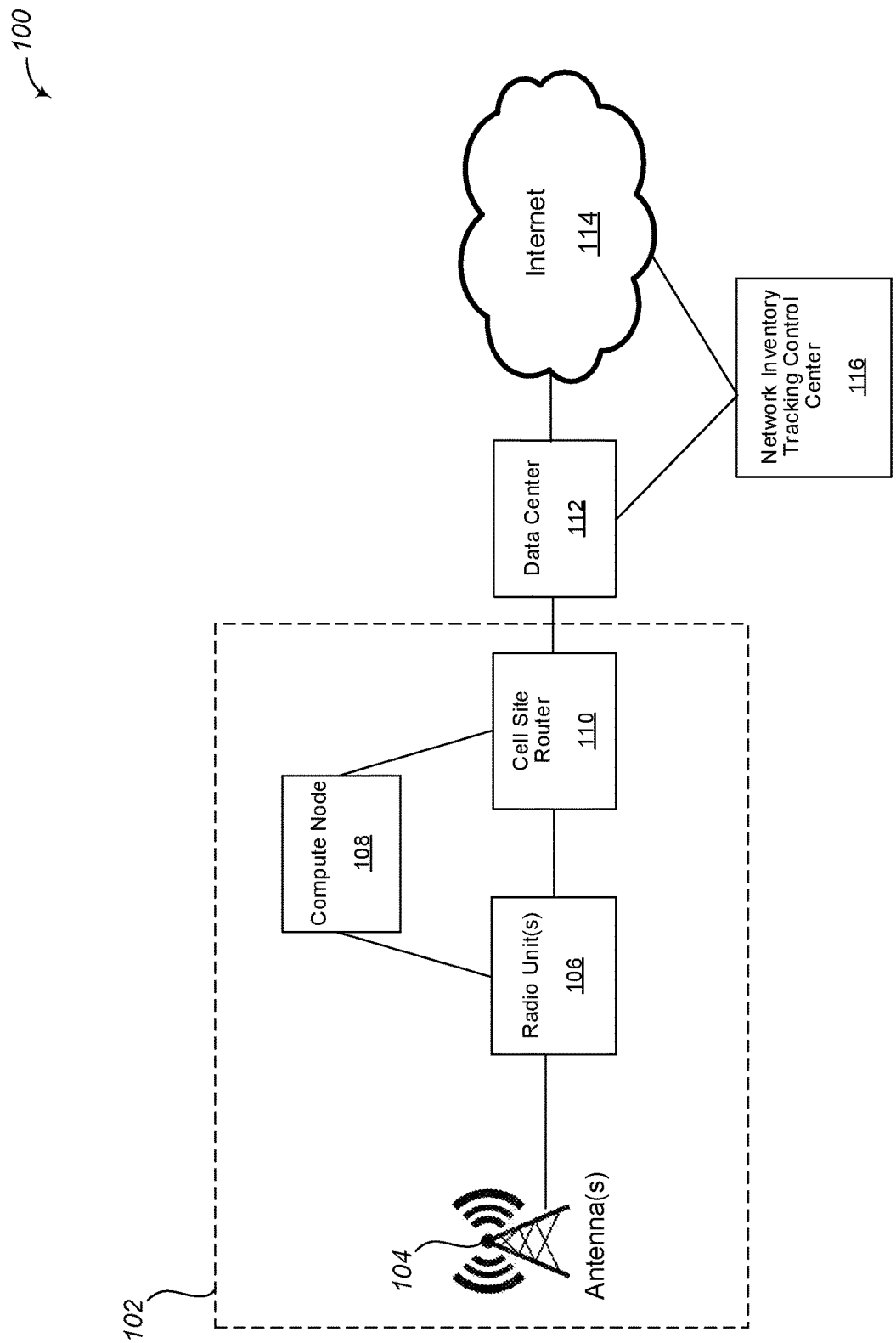
FIG. 1 illustrates a diagram of an example portion of a wireless telecommunication network for which model-based inventory of wireless telecommunication networks may be implemented in accordance with embodiments described herein.

FIG. 1 illustrates a diagram of an example portion of a wireless telecommunication network 100 for which a model-based inventory of wireless telecommunication networks may be implemented in accordance with embodiments described herein.

As shown, the example portion of the wireless telecommunication network 100 (which may also be referred to as an area of interest (AOI)) may, for example, comprise or be a portion of a cloud-native 5G wireless network. 5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtualized RAN with interfaces creating additional data access points.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power is better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNb)) connected to the 5G core (5GC) and to each other. The gNb incorporates three main functional modules: the Centralized Unit (CU), the Distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called as microservices.

The example portion of the wireless telecommunication network 100 shown in FIG. 1, which may comprise or be a portion of a cloud-native 5G wireless network as described above, includes an example cellular (cell) site 102. The cell site 102 may include one or more antennas 104; one or more RUs 106 operably connected to the antenna(s) 104; a cellular site (cell site) router 108 operably connected to the RU(s) 10; and a compute node 108 operably connected to the RU(s) 106 and the cell site router 110. The compute node 108 may run applicable network functions (NFs) associated with the example portion of the wireless telecommunication network 100. Various other network components, equipment or connections may be present in various different embodiments.

The cell site 102 is operably connected to the rest of the wireless telecommunication network via an uplink to a data center 112 (which may be physical, virtual or cloud-based). The data center 112 may include or be connected to a network inventory tracking control center 116 operated by the wireless telecommunication service provider, such as a mobile network operator (MNO). The network inventory tracking control center 116 may be directly connected to the data center 112 and/or be connected to the data center 112 via the Internet 114. In an example embodiment, the network inventory tracking control center 116 implements the model-based inventory system and operations as described herein for the wireless telecommunication network, including the portion of the wireless telecommunication network 100 shown in FIG. 1.

In an example embodiment, before or during the process of the portion of the wireless telecommunication network 100 being implemented (being built and becoming operational), the network inventory tracking control center 116 may electronically build a model of the portion of the wireless telecommunication network 100 according to current standards of the MNO for the wireless telecommunication network. The model includes, according to current standards or designs of the MNO for the wireless telecommunication network, information regarding network components that are expected to appear in the portion of the wireless telecommunication network 100 and the connectivity (e.g., network cabling, interfaces and ports used) between such components as shown in FIG. 1. In one embodiment, the components and connections between such components of the example cell site 102 shown in FIG. 1 may represent at least a portion of the model. Such a model may be, for example, electronically generated and stored by the network inventory tracking control center 116 for reference (either automatically or manually) by the network inventory tracking control center 116 as the actual implementation of the portion of the wireless telecommunication network 100 occurs in the field (including activation of network components).

As the actual implementation of the portion of the wireless telecommunication network 100 occurs, the network inventory tracking control center 116 electronically receives information regarding network components or connectivity between such components in response to the actual implementation. For example, receiving such information as the components are activated may be via a network management or inventory system such as Cisco Element Management system. In one embodiment, the network inventory tracking control center 116 may cause such information regarding the activated network components or connectivity of the network components to be sent to the network inventory tracking control center 116 automatically in response to the activation of network components. This enables the network inventory tracking control center 116 to automatically perform the comparison of the received information regarding network components or connectivity to the model. In particular, in response to receiving the information regarding network components or connectivity, the network inventory tracking control center 116 may automatically compare the received information regarding network components or connectivity to the model according to the current standards of the telecommunication service provider (e.g., MNO) for the wireless telecommunication network.

The network inventory tracking control center 116 may electronically determine whether there exists a discrepancy between the received information regarding network components or connectivity and the model based on the comparison. The network inventory tracking control center 116 may then perform an action based on the determination of whether there exists a discrepancy between the received information regarding network components or connectivity and the model. In one embodiment, the network inventory tracking control center 116 may electronically send an alert based on a determination there is a discrepancy between the received information regarding network components or connectivity and the model. For example, the model may indicate that the uplink from the cell site router 110 to the data center 112 is expected to use a particular port number of the cell site router. When the cell site router 110 is actually connected to the data center, a signal originating from the cell site router 110 may be received at the network inventory tracking control center 116 that indicates a different port is being used. The network inventory tracking control center 116 will compare this received information to the model and determine there is a discrepancy. The network inventory tracking control center 116 may then send an alert or take another action to address or investigate the discrepancy. Some or all of the above actions may be performed automatically by the network inventory tracking control center 116 in various embodiments.

Other network components, configurations, and connections between such components of a cell site than shown in FIG. 1 may be present in various different embodiments.

FIG. 2 is a diagram of an example data structure representing an example model 200 of a portion of a wireless telecommunication network in accordance with an embodiment described herein. The example model 200 includes information for a plurality of different cell sites, each of which may comprise a portion of the wireless telecommunication network, such as the portion of the wireless telecommunication network 100 shown in FIG. 1. The model 200 includes the cell site ID 202 for each cell site in the model 200. For example, the portion of the wireless telecommunication network 100 shown in FIG. 1 may have a cell site ID of X and the model for that portion of the network is represented by the first row of the model 200. The cell site ID may, in some embodiments, be based on the physical location of the cell site such that the physical location of the cell site may be determined by the cell site ID itself.

The example model 200 includes, for each cell site identified by a cell site ID 202, the expected cell site router information 204, the expected compute node information 206, the expected antenna information 208, the expected RU information 210 and the expected cabling information 212. Additional cell sites and/or or different information regarding each particular cell site and/or other network components may be present or included in the model 200 in various different embodiments. For example, information regarding 5G network core and other RAN components may be also or instead included in the model 200.

In an example embodiment, the network component information in the model 200 may include expected information included in the name or identifier (ID) of the particular network component that is electronically received when the cell site with a particular cell site ID 202 is activated or installed. For example, cell site router information 204 for a cell site with Cell Site ID X may include an expected name or identifier (ID) that includes or is encoded with expected information based on the router being located and installed at a the particular cell site with Cell Site ID X. Such expected information included in the expected name or ID for the cell site router may include, but is not limited to: a particular cell site ID, a particular vendor of the router, a particular rack number in which the router is installed, a particular type of router and/or a particular instance of the router. Such information may be represented by "Information A" in FIG. 2. If the name of the cell site router that is received when it is installed at and activated for the cell site with Cell Site ID X is not the same as expected as indicated by "Information A" (e.g., the rack number does not match) then a discrepancy may be automatically identified (flagged) and acted upon by the network inventory tracking control center 116 of FIG. 1.

The model 200 may also be updated manually and/or automatically, and implemented accordingly as the standards for the wireless telecommunication network change.

Figure 3:
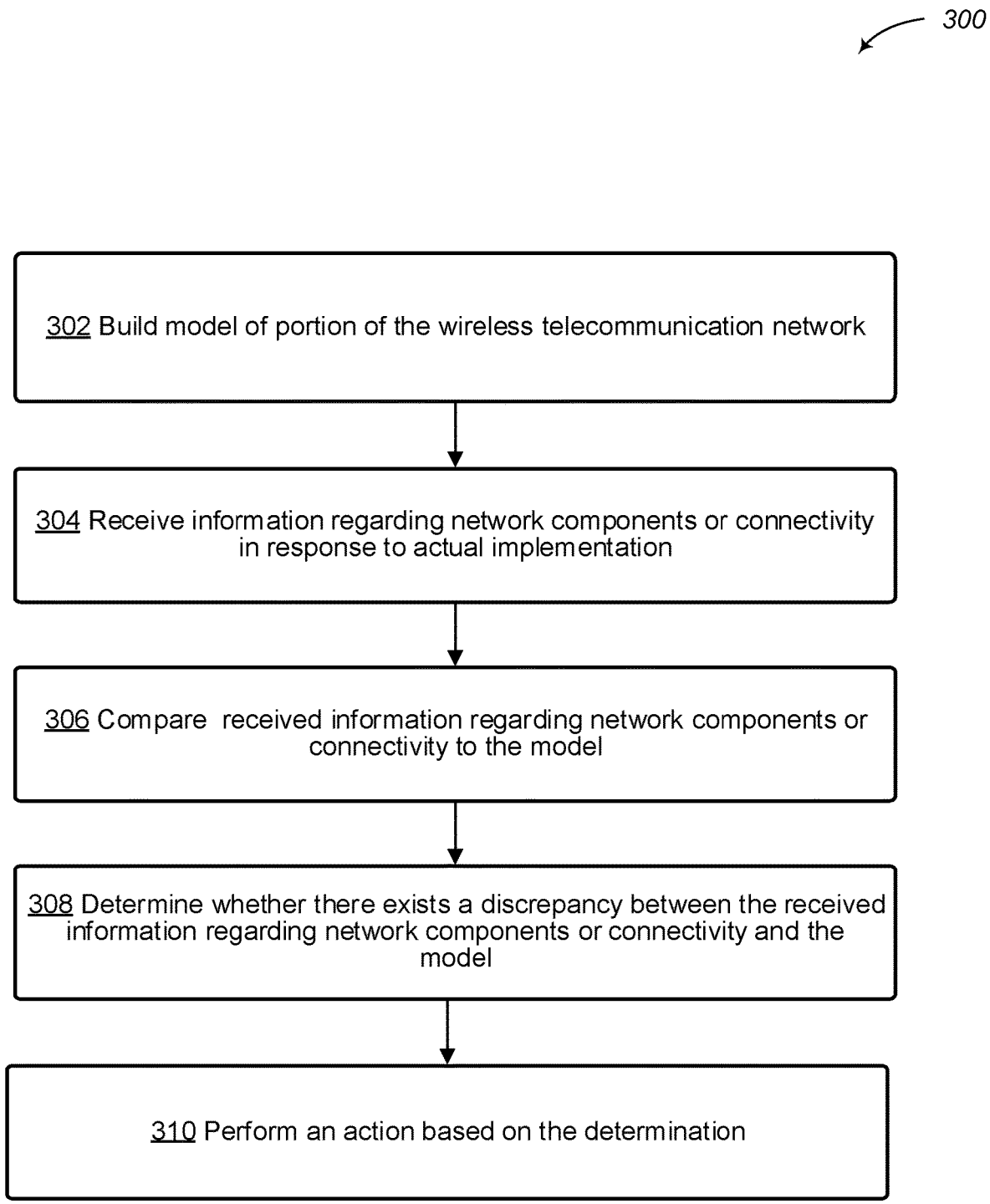
FIG. 3 illustrates a logical flow diagram showing an example embodiment of a process for a model-based inventory of wireless telecommunication networks accordance with embodiments described herein.

FIG. 3 illustrates a logical flow diagram showing an example embodiment of a process 300 for a model-based inventory of wireless telecommunication networks accordance with embodiments described herein. The process 300 may be implemented in a wireless telecommunication network operated by a mobile network operator (MNO).

At 302, the network inventory tracking control center 116 electronically builds a model of at least one planned portion of the wireless telecommunication network according to current standards of the MNO for the wireless telecommunication network. In an example embodiment, the model of at least one planned portion of the wireless telecommunication network is a model of a wireless telecommunication network cellular site (cell site). The building the model may include: including in the model information regarding an expected cell site router of the cell site; including in the model information regarding an expected compute node of the cell site that runs network functions of the cell site; including in the model information regarding one or more expected antennas of the cell site; and including in the model information regarding an expected radio unit (RU) of the cell site.

The building of the model may also further include: including in the model information regarding expected cabling between the one or more expected antennas of the cell site and the expected RU of the cell site; including in the model information regarding expected cabling between the expected RU of the cell site and the expected cell site router of the cell site; including in the model information regarding expected cabling between the expected cell site router of the cell site and the expected compute node of the cell site; and including in the model information regarding expected cabling between the expected cell site router of the cell site and data center of the wireless telecommunication network.

At 304, the network inventory tracking control center 116 electronically receives information regarding network components or connectivity in response to actual implementation of the at least one planned portion of the wireless telecommunication network.

At 306, the network inventory tracking control center 116, in response to receiving the information regarding network components or connectivity, electronically compares the received information regarding network components or connectivity to the model built according to the current standards of the MNO for the wireless telecommunication network. In an example embodiment, the comparing of the received information regarding network components or connectivity to the model includes comparing one or more of: the information regarding the expected cell site router to information received regarding an installed cell site router at the cell site; the information regarding the expected compute node to information received regarding an installed compute node at the cell site; the information regarding the one or more expected antennas to information received regarding one or more installed antennas at the cell site; and the information regarding the expected RU to information received regarding an installed RU at the cell site.

The comparing of the received information regarding network components or connectivity to the model may further or instead include comparing one or more of: the information regarding the expected cabling between the one or more expected antennas of the cell site and the expected RU of the cell site to information received regarding installed cabling between one or more installed antennas at the cell site and an installed RU at the cell site; the information regarding expected cabling between the expected RU of the cell site and the expected cell site router of the cell site to information received regarding cabling installed between an installed RU at the cell site and an installed cell site router at the cell site; the information regarding the expected cabling between the expected cell site router of the cell site and the expected compute node of the cell site and information received regarding installed cabling between an installed cell site router at the cell site and an installed compute node at the cell site; and the information regarding the expected cabling between the expected cell site router of the cell site and the data center to cabling between an installed cell site router at the cell site and the data center. The information regarding the expected cabling between the expected cell site router of the cell site and data center of the wireless telecommunication network may include an indication of which port of the cell site router is to be used for uplink to the datacenter.

Also, in some embodiments, the electronic comparison of the received information regarding network components is automatically performed in response to receiving the information regarding network components or connectivity.

At 308, the network inventory tracking control center 116 electronically determines whether there exists a discrepancy between the received information regarding network components or connectivity and the model based on the comparison. The determination whether there exists a discrepancy between the received information regarding network components or connectivity and the model based may be in some embodiments performed automatically in response to the comparison.

At 310, the network inventory tracking control center 116 performs an action based on the determination of whether there exists a discrepancy between the received information regarding network components or connectivity and the model.

Figure 4:
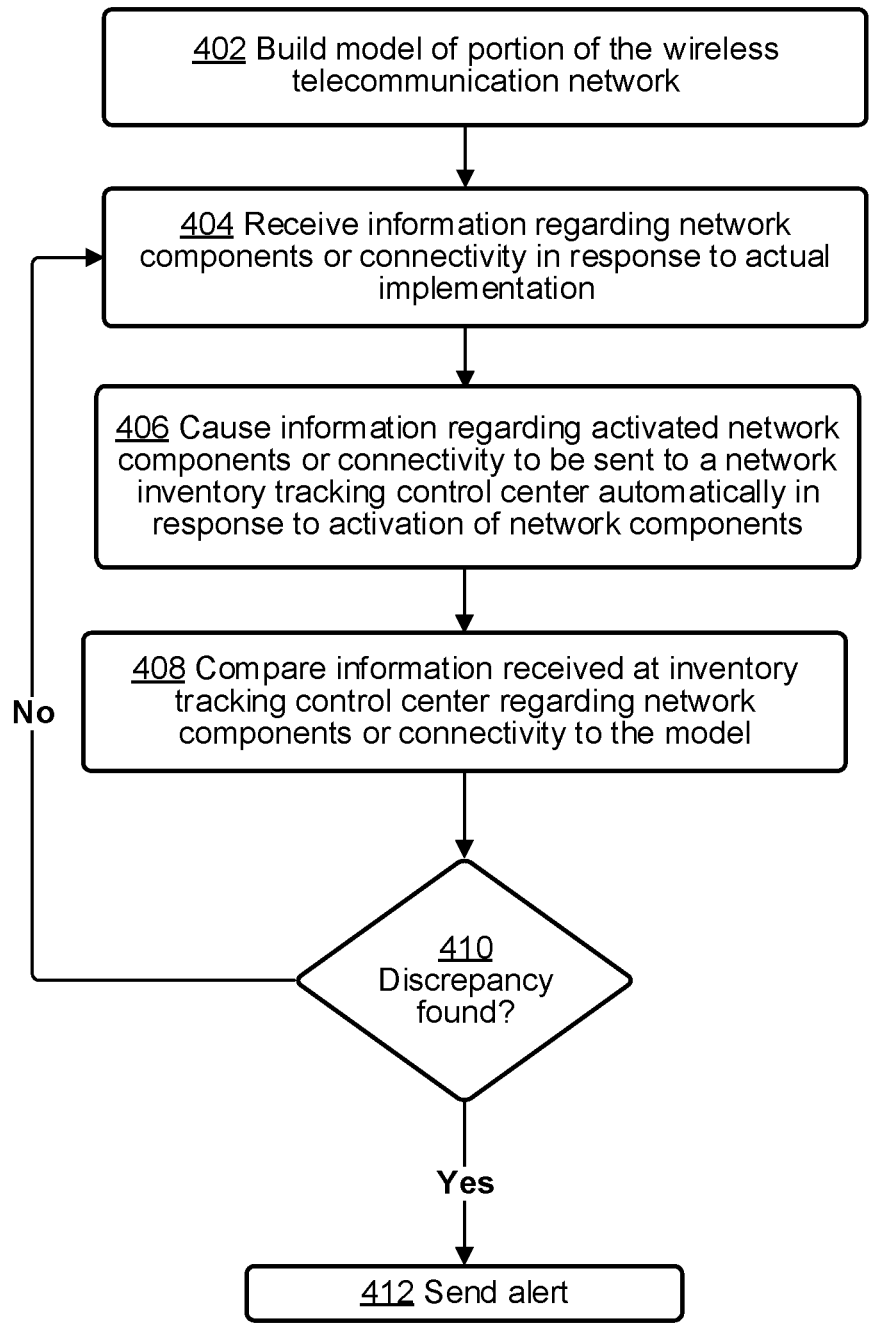
FIG. 4 illustrates a logical flow diagram showing an example embodiment of a process for a model-based inventory of wireless telecommunication networks handling a discrepancy found between the model and received information in accordance with embodiments described herein.

FIG. 4 illustrates a logical flow diagram showing an example embodiment of a process 400 for a model-based inventory of wireless telecommunication networks handling a discrepancy found between the model and received information in accordance with embodiments described herein.

At 402, the network inventory tracking control center 116 electronically builds a model of at least one planned portion of the wireless telecommunication network according to current standards of the MNO for the wireless telecommunication network.

At 404, the network inventory tracking control center 116 electronically receives information regarding network components or connectivity in response to actual implementation of the at least one planned portion of the wireless telecommunication network.

At 406, the network inventory tracking control center 116 causes information regarding the activated network components or connectivity of the network components to be sent to the network inventory tracking control center 116 automatically in response to the activation of network components.

At 408, the network inventory tracking control center 116, in response to receiving the information regarding network components or connectivity, electronically compares the received information regarding network components or connectivity to the model built according to the current standards of the MNO for the wireless telecommunication network. In the present example embodiment, the comparison is enabled by the activated network components or connectivity of the network components to being sent to the network inventory tracking control center 116 automatically in response to the activation of network components.

At 410, the network inventory tracking control center 116 electronically determines whether there exists a discrepancy between the received information regarding network components or connectivity and the model based on the comparison. If it is determined there exists a discrepancy between the received information regarding network components or connectivity and the model, the process 400 proceeds to 410. Otherwise, the process 400 proceeds back to 404 to continue receiving and processing the information regarding network components being activated in the network.

At 412, the network inventory tracking control center 116 electronically sends an alert or initiates other corrective actions based on (e.g. in response to) the determination there is a discrepancy between the received information regarding network components or connectivity and the model.

Figure 5:
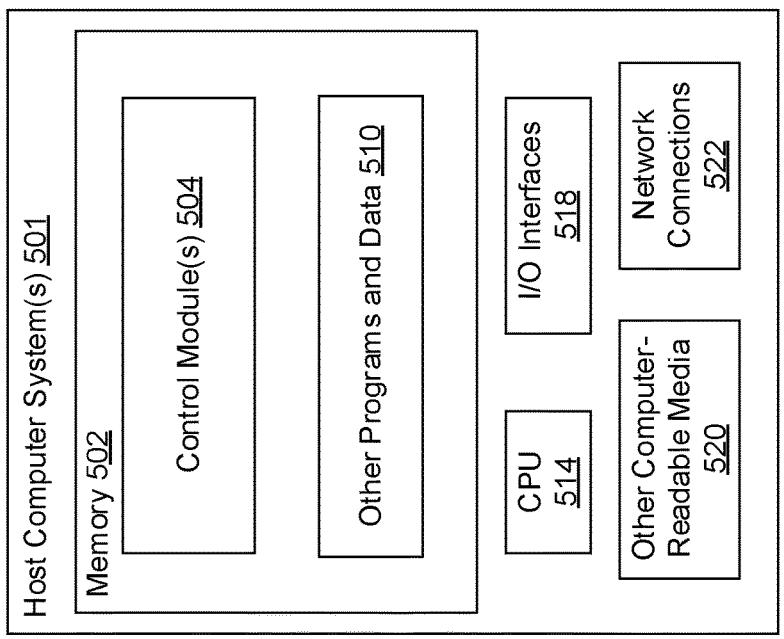
FIG. 5 shows a system diagram that describes an example implementation of computing system(s) for implementing embodiments described herein.

FIG. 5 shows a system diagram that describes an example implementation of computing system(s) 500 for implementing embodiments described herein.

The functionality described herein for model-based inventory of wireless telecommunication networks can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 5 illustrates an example of underlying hardware on which such software and functionality may be hosted and/or implemented. For example, computer system(s) 501 may represent example components of underlying computer hardware for some or all of the components shown in FIG. 1.

In particular, shown is example host computer system(s) 501. For example, such computer system(s) 501 may represent one or more of those in various data centers, base stations and cell sites shown and/or described herein that are, or that host or implement the functions of: routers, components, microservices, nodes, node groups, control planes, clusters, virtual machines, NFs, and other aspects described herein for model-based inventory of wireless telecommunication networks. In some embodiments, one or more special-purpose computing systems may be used to implement the functionality described herein. Accordingly, various embodiments described herein may be implemented in software, hardware, firmware, or in some combination thereof. Host computer system(s) 501 may include memory 502, one or more central processing units (CPUs) 514, I/O interfaces 518, other computer-readable media 520, and network connections 522.

Memory 502 may include one or more various types of non-volatile and/or volatile storage technologies. Examples of memory 502 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 502 may be utilized to store information, including computer-readable instructions that are utilized by CPU 514 to perform actions, including those of embodiments described herein.

Memory 502 may have stored thereon control module(s) 1804. The control module(s) 1804 may be configured to implement and/or perform some or all of the functions of the systems, components and modules described herein for model-based inventory of wireless telecommunication networks. Memory 502 may also store other programs and data 510, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 522 are configured to communicate with other computing devices to facilitate the functionality described herein. In various embodiments, the network connections 522 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 518 may include a video interfaces, other data input or output interfaces, or the like. Other computer-readable media 520 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a wireless telecommunication network operated by a mobile network operator (MNO), the method comprising:
   electronically building a model of at least one planned portion of the wireless telecommunication network according to current standards of the MNO for the wireless telecommunication network;
   electronically receiving information regarding network components or connectivity in response to actual implementation of the at least one planned portion of the wireless telecommunication network;
   in response receiving the information regarding network components or connectivity, electronically comparing the received information regarding network components or connectivity to the model built according to the current standards of the MNO for the wireless telecommunication network;
   electronically determining whether there exists a discrepancy between the received information regarding network components or connectivity and the model based on the comparison; and
   performing an action based on the determination of whether there exists a discrepancy between the received information regarding network components or connectivity and the model, wherein the model of at least one planned portion of the wireless telecommunication network is a model of a wireless telecommunication network cellular site (cell site) and the building the model includes:
      including in the model information regarding an expected cell site router of the cell site:
      including in the model information regarding an expected compute node of the cell site that runs network functions of the cell site;
      including in the model information regarding one or more expected antennas of the cell site; and
      including in the model information regarding an expected radio unit (RU) of the cell site.

2. The method of claim 1, wherein the comparing the received information regarding network components or connectivity to the model includes comparing one or more of:
   the information regarding the expected cell site router to information received regarding an installed cell site router at the cell site;
   the information regarding the expected compute node to information received regarding an installed compute node at the cell site;

the information regarding the one or more expected antennas to information received regarding one or more installed antennas at the cell site; and the information regarding the expected RU to information received regarding an installed RU at the cell site.

3. The method of claim 1, wherein the building the model further includes:

including in the model information regarding expected cabling between the one or more expected antennas of the cell site and the expected RU of the cell site;

including in the model information regarding expected cabling between the expected RU of the cell site and the expected cell site router of the cell site;

including in the model information regarding expected cabling between the expected cell site router of the cell site and the expected compute node of the cell site; and including in the model information regarding expected cabling between the expected cell site router of the cell site and data center of the wireless telecommunication network.

4. The method of claim 3, wherein the comparing the received information regarding network components or connectivity to the model further includes comparing one or more of:

the information regarding the expected cabling between the one or more expected antennas of the cell site and the expected RU of the cell site to information received regarding installed cabling between one or more installed antennas at the cell site and an installed RU at the cell site;

the information regarding expected cabling between the expected RU of the cell site and the expected cell site router of the cell site to information received regarding cabling installed between an installed RU at the cell site and an installed cell site router at the cell site;

the information regarding the expected cabling between the expected cell site router of the cell site and the expected compute node of the cell site and information received regarding installed cabling between an installed cell site router at the cell site and an installed compute node at the cell site; and the information regarding the expected cabling between the expected cell site router of the cell site and the data center to cabling between an installed cell site router at the cell site and the data center.

5. The method of claim 4, wherein the information regarding the expected cabling between the expected cell site router of the cell site and data center of the wireless telecommunication network includes an indication of which port of the cell site router is to be used for uplink to the datacenter.

6. The method of claim 1 wherein the electronically comparing the received information regarding network components is automatically performed in response receiving the information regarding network components or connectivity.

7. The method of claim 1 wherein the electronically determining whether there exists a discrepancy between the received information regarding network components or connectivity and the model based is performed automatically in response to the comparison.

8. The method of claim 1 wherein the performing the action based on the determination of whether there exists a discrepancy between the received information regarding network components or connectivity and the model includes electronically sending an alert based on a determination there is a discrepancy between the received information regarding network components or connectivity and the model.

9. The method of claim 1 wherein the electronically receiving information regarding network components or connectivity in response to the actual implementation of the at least one planned portion of the wireless telecommunication network includes:

activating network components of the of the at least one planned portion of the wireless telecommunication network; and causing information regarding the activated network components or connectivity of the network components to be sent to a network inventory tracking control center automatically in response to the activation of network components, enabling the network inventory tracking control center to perform the comparison of the received information regarding network components or connectivity to the model.

10. A system in a wireless telecommunication network operated by a mobile network operator (MNO), the system comprising:

at least one memory that stores computer executable instructions; and at least one processor that executes the computer executable instructions to cause actions to be performed, the actions including:

electronically building a model of at least one planned portion of the wireless telecommunication network according to current standards of the MNO for the wireless telecommunication network;

electronically receiving information regarding network components or connectivity in response to actual implementation of the at least one planned portion of the wireless telecommunication network;

in response receiving the information regarding network components or connectivity, electronically comparing the received information regarding network components or connectivity to the model built according to the current standards of the MNO for the wireless telecommunication network;

electronically determining whether there exists a discrepancy between the received information regarding network components or connectivity and the model based on the comparison; and performing an action based on the determination of whether there exists a discrepancy between the received information regarding network components or connectivity and the model, wherein the model of at least one planned portion of the wireless telecommunication network is a model of a wireless telecommunication network cellular site (cell site) and the building the model includes:

including in the model information regarding an expected cell site router of the cell site;

including in the model information regarding an expected compute node of the cell site that runs network functions of the cell site;

including in the model information regarding one or more expected antennas of the cell site; and including in the model information regarding an expected radio unit (RU) of the cell site.

11. The system of claim 10, wherein the comparing the received information regarding network components or connectivity to the model includes comparing one or more of:

the information regarding the expected cell site router to information received regarding an installed cell site router at the cell site;

the information regarding the expected compute node to information received regarding an installed compute node at the cell site;

the information regarding the one or more expected antennas to information received regarding one or more installed antennas at the cell site; and the information regarding the expected RU to information received regarding an installed RU at the cell site.

12. The system of claim 10, wherein the building the model further includes:

including in the model information regarding expected cabling between the one or more expected antennas of the cell site and the expected RU of the cell site;

including in the model information regarding expected cabling between the expected RU of the cell site and the expected cell site router of the cell site;

including in the model information regarding expected cabling between the expected cell site router of the cell site and the expected compute node of the cell site; and including in the model information regarding expected cabling between the expected cell site router of the cell site and data center of the wireless telecommunication network.

13. The system of claim 12, wherein the comparing the received information regarding network components or connectivity to the model further includes comparing one or more of:

the information regarding the expected cabling between the one or more expected antennas of the cell site and the expected RU of the cell site to information received regarding installed cabling between one or more installed antennas at the cell site and an installed RU at the cell site;

the information regarding expected cabling between the expected RU of the cell site and the expected cell site router of the cell site to information received regarding cabling installed between an installed RU at the cell site and an installed cell site router at the cell site;

the information regarding the expected cabling between the expected cell site router of the cell site and the expected compute node of the cell site and information received regarding installed cabling between an installed cell site router at the cell site and an installed compute node at the cell site; and the information regarding the expected cabling between the expected cell site router of the cell site and the data center to cabling between an installed cell site router at the cell site and the data center.

14. A non-transitory computer-readable storage medium having computer-executable instructions stored thereon that, when executed by at least one processor, cause the at least one processor to cause actions to be performed in a wireless telecommunication network operated by a mobile network operator (MNO), the actions including:

electronically building a model of at least one planned portion of the wireless telecommunication network according to current standards of the MNO for the wireless telecommunication network;

electronically receiving information regarding network components or connectivity in response to actual implementation of the at least one planned portion of the wireless telecommunication network;

in response receiving the information regarding network components or connectivity, electronically comparing the received information regarding network components or connectivity to the model built according to the current standards of the MNO for the wireless telecommunication network;

electronically determining whether there exists a discrepancy between the received information regarding network components or connectivity and the model based on the comparison; and performing an action based on the determination of whether there exists a discrepancy between the received information regarding network components or connectivity and the model, wherein the model of at least one planned portion of the wireless telecommunication network is a model of a wireless telecommunication network cellular site (cell site) and the building the model includes:

including in the model information regarding an expected cell site router of the cell site;

including in the model information regarding an expected compute node of the cell site that runs network functions of the cell site;

including in the model information regarding one or more expected antennas of the cell site; and including in the model information regarding an expected radio unit (RU) of the cell site.

15. The non-transitory computer-readable storage medium of claim 14, wherein the comparing the received information regarding network components or connectivity to the model includes comparing one or more of:

the information regarding the expected cell site router to information received regarding an installed cell site router at the cell site;

the information regarding the expected compute node to information received regarding an installed compute node at the cell site;

the information regarding the one or more expected antennas to information received regarding one or more installed antennas at the cell site; and the information regarding the expected RU to information received regarding an installed RU at the cell site.

16. The non-transitory computer-readable storage medium of claim 14, wherein the building the model further includes:

including in the model information regarding expected cabling between the one or more expected antennas of the cell site and the expected RU of the cell site;

including in the model information regarding expected cabling between the expected RU of the cell site and the expected cell site router of the cell site;

including in the model information regarding expected cabling between the expected cell site router of the cell site and the expected compute node of the cell site; and including in the model information regarding expected cabling between the expected cell site router of the cell site and data center of the wireless telecommunication network.

17. The non-transitory computer-readable storage medium of claim 16, wherein the comparing the received information regarding network components or connectivity to the model further includes comparing one or more of:

the information regarding the expected cabling between the one or more expected antennas of the cell site and the expected RU of the cell site to information received regarding installed cabling between one or more installed antennas at the cell site and an installed RU at the cell site;

the information regarding expected cabling between the expected RU of the cell site and the expected cell site router of the cell site to information received regarding cabling installed between an installed RU at the cell site and an installed cell site router at the cell site;

the information regarding the expected cabling between the expected cell site router of the cell site and the expected compute node of the cell site and information received regarding installed cabling between an installed cell site router at the cell site and an installed compute node at the cell site; and the information regarding the expected cabling between the expected cell site router of the cell site and the data center to cabling between an installed cell site router at the cell site and the data center.

* * * * *